United States Patent [19]

Firestone

[11] Patent Number: 4,889,370
[45] Date of Patent: Dec. 26, 1989

[54] PIPE REPAIR ASSEMBLY

[76] Inventor: Douglas B. Firestone, 9182 Tonya La., Santee, Calif. 92071

[21] Appl. No.: 200,533

[22] Filed: May 31, 1988

[51] Int. Cl.$^4$ ............................................. F16C 21/06
[52] U.S. Cl. .................................... 285/342; 285/373; 138/99
[58] Field of Search ................ 285/373, 419, 421, 15, 285/342, 369, 342; 138/99

[56] References Cited

U.S. PATENT DOCUMENTS

| 91,319 | 6/1869 | Fifield . | |
|---|---|---|---|
| 212,257 | 2/1879 | Norris, Jr. . | |
| 452,307 | 5/1891 | Lee | 138/99 |
| 518,805 | 4/1894 | Cooper | 138/99 |
| 657,712 | 9/1900 | Thomas | 285/342 |
| 672,244 | 4/1901 | Traunfels . | |
| 1,219,978 | 3/1917 | Masters . | |
| 1,445,858 | 2/1923 | Tallman | 285/369 X |
| 1,520,705 | 12/1924 | Farmer | 285/342 X |
| 1,586,105 | 5/1926 | Moulet . | |
| 1,821,863 | 9/1931 | Wilson . | |
| 1,821,865 | 9/1931 | Wilson . | |
| 2,001,614 | 5/1935 | Johnson . | |
| 2,011,433 | 8/1935 | Blagg et al. . | |
| 2,052,958 | 9/1936 | Webb | 285/419 X |
| 2,173,399 | 9/1939 | Mills | 138/99 |
| 2,215,476 | 9/1940 | Peters | 29/148 |
| 2,296,968 | 9/1942 | Wirz, Jr. | 138/99 X |
| 2,496,402 | 2/1950 | McVeigh et al. | 242/124 |
| 2,701,731 | 2/1955 | Risley . | |
| 2,898,945 | 8/1959 | Backer | 285/373 X |
| 2,911,239 | 11/1959 | Marzolf, Sr. | 285/415 |
| 3,380,763 | 4/1968 | Schmunk | 285/369 X |
| 3,749,426 | 7/1973 | Tillman, III | 285/336 |
| 4,109,944 | 8/1978 | Curtin | 285/373 |
| 4,455,041 | 6/1984 | Martin | 285/369 |
| 4,662,660 | 5/1987 | Perea | 285/342 |

FOREIGN PATENT DOCUMENTS

| 440933 | 5/1912 | France | 138/99 |
|---|---|---|---|
| 1078733 | 11/1954 | France | 285/909 |
| 18666 | of 1900 | United Kingdom | 285/419 |

OTHER PUBLICATIONS

Split Sleeves, Dresser Catalog, Nov. 1984.

Primary Examiner—Thomas F. Callaghan
Attorney, Agent, or Firm—Brown, Martin, Haller & McClain

[57] ABSTRACT

A weldless pipe repair assembly comprises a cylindrical hub member having a through bore, the hub member being formed in two separable, mating parts for slidable interfitting engagement, a first one of the parts having a longitudinal slot for fitting the part transversely over a pipe in the area of a leak or rupture, prior to sliding the second part into engagement with the first part so that the hub member surrounds the pipe. At least one sealing sleeve is designed to fit in the hub bore to seal the space between the pipe and hub member, the sleeve being slit to allow it to fit over the pipe, and a locking assembly is provided for urging the sleeve into the hub member and sealing the sleeve against the pipe.

9 Claims, 1 Drawing Sheet

PIPE REPAIR ASSEMBLY

BACKGROUND OF THE INVENTION

The present invention relates generally to pipe fittings or repair assemblies for repairing ruptured or leaking pipes.

Various types of pipe fittings are known which may be used for repairing ruptured pipes or for coupling together the ends of adjacent pipe sections. Gas, oil or other pipelines on land or under the sea often become damaged or ruptured as a result of ground movement, vandalism, improper insertion or general pipe wear. Repairs of these types of pipeline typically involve cutting out the defective section of pipe and replacing it with a new section, either by welding the new section in place or by bolting suitable couplings over the adjacent pipe, and back welding on the repair device itself. This is relatively time consuming.

In some areas welding of pipeline joints is a problem due to explosion risk. For example, oil refineries and the engine rooms of ships are areas of extreme explosion or fire hazard, and if repairs requiring on-site welding must be made to pipes in these areas, the areas to be worked must first be freed of all flammable gases and liquids, a process known as "gas freeing". This is a costly and lengthy process.

Thus coupling assemblies involving bands and clamps have been proposed in the past for pipe repairs to avoid the need for on-site welding. These assemblies typically lack the reliability and durability of a welded joint, and most require the damaged section, of pipe to be cut out and replaced with a new section, which is relatively time consuming and expensive. In U.S. Pat. No. 4,662,660 of Perea, for example, a weldless pipe fitting is described which has two sealing sleeves for fitting over respective adjacent pipe ends, the sealing sleeves having a frusto-conical outer surfaces, and an outer collar having corresponding frusto-conical inner surfaces which mate with the respective sleeves to urge them into sealing engagement with the pipes. A locking assembly is applied to the opposite ends of the collar to urge the sleeves into the collar and into sealing engagement with the pipes. Some repair assemblies are known which allow a fracture to be repaired without cutting out the damaged section. These generally comprise split sleeves which must be bolted together, and are not normally suitable for high pressure applications.

SUMMARY OF THE INVENTION

It is an object of the present invention to provide an improved pipe repair assembly which does not require welding or cutting out of a damaged pipe section.

According to the present invention, a pipe repair assembly is provided which comprises an elongate hub member having a through bore sized to fit over a pipe, the hub member being formed in two separate slidably interfitting portions, a first one of the portions having a longitudinal slot sized to allow the portion to be fitted transversely over a section of pipe to be repaired, and the second portion being slidable longitudinally into the first section to cover the slot, at least one sealing sleeve for fitting in the gap between the hub member through bore and the pipe, the sleeve having a slit to allow it to be fitted over the pipe, and a locking assembly for urging the sealing sleeve into the hub member through bore and sealing it against the pipe.

In the preferred embodiment of the invention, the hub member through bore has frusto-conical sections of opposite taper extending from its opposite ends towards the central area of the hub member, and two sealing sleeves are provided for fitting into the respective opposite frusto-conical sections of the hub member, the sealing sleeves having frusto-conical outer surfaces of complementary shape to the frusto-conical hub sections for mating engagement with the hub through bore. The inner diameter of the sleeves is sized for a close sliding fit over the pipe, and in the preferred embodiment of the invention the sleeves have complementary formations at their inner ends for allowing the sleeves to overlap into sealing engagement with one another when urged into opposite ends of the hub by the locking assembly. For example, one of the sleeves may have a frusto-conical indent at its inner end for receiving the corresponding inner end of the other sleeve when both sleeves are urged into locking engagement in the hub.

The sleeves are preferably of Teflon or the like, which is durable and resistant to extreme temperatures, as well as being substantially inert or non-reactive to most chemicals. For relatively large diameter pipes, the sleeves may have a longitudinal slit for enabling them to fit transversely over the pipe before sliding them into the hub member. However, for smaller pipes a spiral slit may be provided to allow the sleeves to be wrapped around the pipe. When the sleeves are urged into locking engagement in the hub, the opposing faces of the slit will be urged into sealing engagement, and a sealing engagement will also be provided between the overlapping inner ends of the sleeves.

In the preferred embodiment of the invention the locking assembly comprises a pair of annular flanges for fitting against opposite ends of the hub member, and shims or collars projecting from the flanges into the hub through bore to engage the outer ends of the respective sealing sleeves. Suitable locking devices such as bolts are provided for securing the flanges to the hub and at the same time urging the collars into the hub bore to urge the sleeves into sealing engagement with one another and with the underlying pipe. The annular flanges and collars are each suitably split into two parts or halves for fitting over the pipe, with securing devices for holding the parts together.

Preferably, the first portion of the hub member has a part cylindrical cut out extending across the longitudinal slot, while the second portion of the hub member is of corresponding part-cylindrical shape for mating, sliding engagement in the cut out. The interengaging surfaces of the first and second portions preferably have a corresponding slight taper to ensure that the second portion will slide easily into the first portion over a pipe.

With this arrangement, it is not necessary to cut out a damaged pipe section. The hub member can be simply placed over the appropriate area of the pipe to cover the fracture or leak, after which the sealing sleeves can be pushed into opposite ends of the hub member, and the locking assembly is then secured to the hub member to urge the sleeves into sealing engagement with the pipe to seal the fracture. If the fracture is very long, the damaged section may be cut out and the repair assembly used in a similar fashion to couple a new pipe section to the resultant pipe ends. Since no welding is required, the assembly is suitable for use in environments where there is an explosion or fire hazard, such as refineries or the engine rooms of ships. The assembly is both quick and easy to install, and is relatively inexpensive, making it suitable for use in any pipeline application, both for repairing fractures without needing a new pipe section, and also for joining adjacent ends of two pipe sections together.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 2:
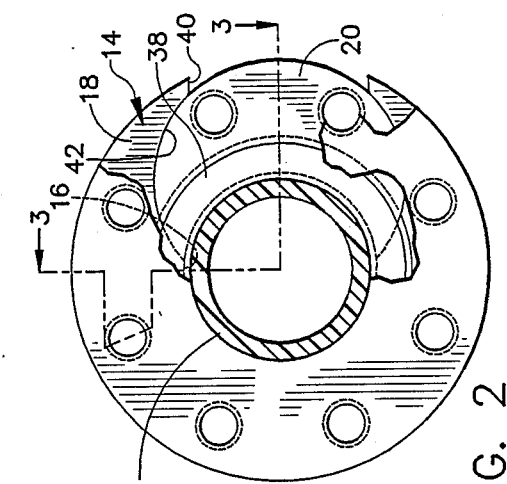
FIG. 2 is an end elevation view showing the assembly assembled on a pipe, with parts broken away.

The drawings show a pipe fitting or repair assembly 10 according to a preferred embodiment of the present invention for repairing a fracture or leak in a pipe 12. The assembly is intended primarily for fitting around an existing pipe in the area of a leak without cutting out the fractured section, but in the case of a very long fracture, the section may be cut out and the assembly can then be used to join the resultant pipe ends to a new pipe section, as explained in more detail below.

The repair assembly 10 basically comprises a generally cylindrical hub member 14 having a through bore 16 for fitting over a pipe, the hub member being formed in two slidably interfitting sections 18 and 20, and a pair of sealing sleeves 22, 24 for fitting into the hub through bore to seal over the underlying pipe.

Figure 1:
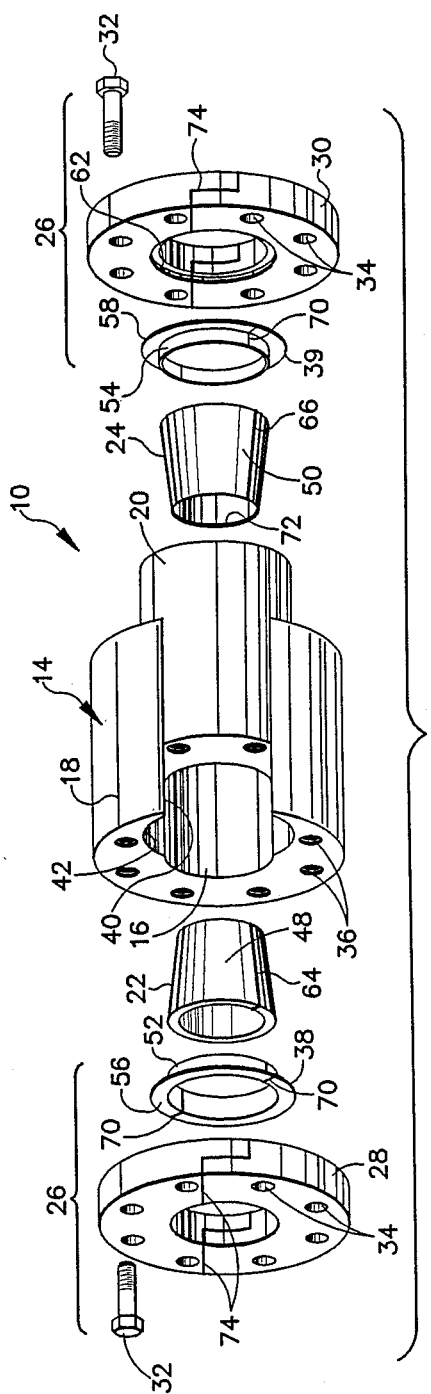
FIG. 1 is a perspective view showing the parts of a pipe repair or coupling assembly according to a preferred embodiment of the invention.
Figure 3:
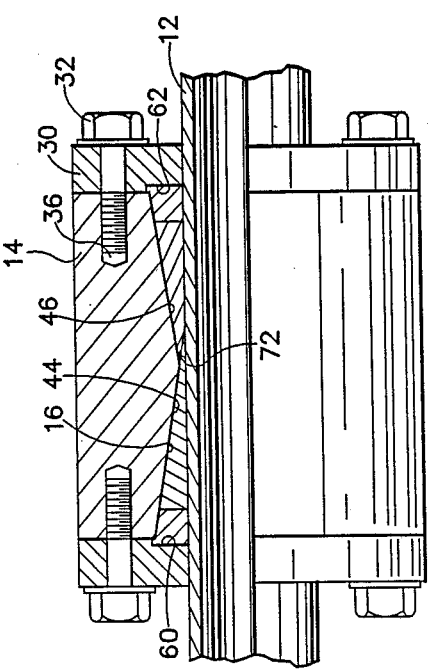
FIG. 3 is a sectional view on the lines 3—3 of FIG. 2.

A locking assembly 26 is provided for urging the sleeves 22, 24 into the bore and into sealing engagement with the pipe. The locking assembly comprises a pair of annular flanges 28, 30 for securing to respective opposite ends of the hub member via a series of bolts 32 which extend through aligned openings 34, 36 in the flanges and respective ends of the hub member, respectively, as indicated in FIGS. 1 and 3. An annular shim or collar 38, 39 projects from each flange 28, 30, respectively, into the respective end of the through bore 16 to urge the respective sealing sleeve into sealing engagement in the bore.

The assembly 10 is designed to be fitted over the pipe 12 without having to cut out a damaged section of the pipe. The first section 18 of the hub member has a longitudinal slot 40 of width slightly larger than the pipe diameter so that the section 18 can be fitted transversely over the pipe 12. A part-cylindrical cut-out 42 is provided in section 18 extending on opposite sides of the slot 40, and the second section 2 is of corresponding part-cylindrical shape for mating, sliding engagement in the cut-out to fit the hub member around the pipe. The opposing faces of the cut out 42 and section 20 preferably have a corresponding slight taper to ensure that the section 20 can slide into place relatively easily without binding. This taper may be of the order of 1.5 degrees.

The through bore 16 has two opposing frusto-conical sections 44, 46 of decreasing diameter extending from its opposite ends to the center of the hub member, as best shown in FIG. 3. The sealing sleeves have outer surfaces 48, 50 of complementary frusto-conical shape for mating engagement with the respective sections of the hub through bore. The locking collars 38, 39 also have generally frusto-conical outer surfaces 52, 54 for mating engagement in the opposite ends of the bore 16. The outer ends of the locking collars have annular rims 56, 58 for fitting in corresponding indents 60, 62 in the respective locking flange 28, 30.

Figure 4:
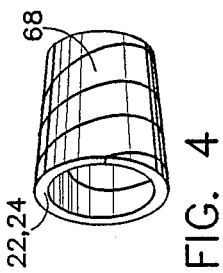
FIG. 4 is a perspective view of a modified sealing sleeve for use with relatively small pipes.

All the parts of the repair assembly must be capable of fitting around a pipe without cutting out of a pipe section. The sealing sleeves 22, 24 each have a longitudinal slit 64, 66 for enabling the sleeve to be fitted transversely over the pipe 12. The internal diameter of the sleeves will be designed to be a close fit over the pipe to be repaired. The sleeves are preferably of a plastics material such as Teflon (Registered Trade Mark) or the like, which is relatively inert to the majority of chemicals and durable over extreme temperature ranges. This will be flexible enough to enable the sleeves to be fitted transversely over the pipe for pipe diameters over 3 inches. However, for repairing pipes of diameter 3 inches or less, the sleeves will not be flexible enough to expand over the pipe with only a longitudinal slit, and FIG. 4 shows a modified sleeve for use in repairing relatively small pipes. In FIG. 4, the longitudinal slit is replaced by a spiral slit 68 allowing the seal to be wrapped around the pipe. In all cases, the slit 64, 66, 68 is preferably cut at an angle to provide maximum surface area for a good plastic to plastic seal when the sleeves are urged into the hub through bore.

The sleeves have complementary formations at their inner ends allowing them to overlap into sealing engagement with one another when locked into the hub bore as indicated in FIG. 3. Preferably, one of the sleeves 24 has a frusto-conical indent 72 at its inner end which is of complementary shape to the outer surface of the other sleeve 22 at its inner end, as shown in FIG. 3.

Each locking flange and collar may be formed integrally. However, in the preferred embodiment shown in the drawings the flange and collar are formed as two separate parts, each of which is split transversely into two semi-circular halves for fitting around the pipe prior to locking in place against the hub. The collar halves are separated along lines 70, and may be secured around the pipe by any suitable securing device prior to being urged into the appropriate end of the hub member. The securing device may, for example, comprise a split snap ring fitting into a suitable circumferential groove extending around the collar halves, or alternatively internal pins may be provided to extend from one half of the collar into aligned slots in the other half to connect the halves together.

The flanges are also formed in two halves separated along diametrically opposite lines 74, and are mounted around the pipe before being secured together and to the appropriate end of the hub member via the bolts 32. In the preferred embodiment the flanges and hub member are of metal such as steel, while the collars are of plastics material, although all the parts of the assembly may be of plastics material.

The hub member may be manufactured by first taking a main, solid cylinder for forming the hub portion 18. An off-center, cylindrical bore is drilled in the cylinder with the appropriate slight taper for receiving part 20. A second cylinder of appropriate dimensions is machined with a watching taper for fitting the drilled bore. The two cylinders are then mated together, and held by pins or the like against relative rotation while through bore 16 is drilled. The opposing tapered portions 44, 46 are then formed, and bolt holes 36 are drilled before separating the parts 18 and 20.

The co-operating sealing sleeves are made with close tolerances to ensure a good sealing engagement when they are locked into the hub. The assembly dimensions will be selected according to the pipe to be repaired or joined. Repair assemblies in all standard pipe sizes will be provided.

The repair assembly described above may be used both to repair fractured or leaking pipes and also to connect adjacent pipe ends, for example in the case of a long or large fracture where the fractured section must be removed and replaced by a new section, or in simply connecting the ends of adjacent pipes during installation of a long length of pipeline.

When the assembly described above is to be used to repair a relatively small fracture in a pipe, an assembly having the appropriate dimensions for fitting the pipe will be selected. The first part 18 of the hub is then mounted over the fractured part of the pipe, and the second part 20 is slid into the first part to cover the slot. The two sleeves 22, 24 are engaged over the pipe at opposite ends of the hub member, and are then pushed into the opposite ends of the bore. Collars 38, 39 are then mounted at the opposite ends of the bore, and the flanges are secured to the opposite ends of the hub member to urge the collars and sleeves inwardly. The two sleeves will overlap into sealing engagement at their inner ends, and will seal against the underlying pipe to seal the fracture. This provides a good plastic-to-plastic seal with little risk of leakage.

For repair of a longer fracture, the fractured section will first be cut out and replaced by a new pipe section, each end of the pipe section being secured to the respective ends of the original pipe by means of the fitting described above.

Thus the pipe repair assembly described above allows repairs to be made to fractured pipes quickly and easily, without requiring welding or cutting out of damaged pipe sections. It is therefore particularly useful in areas where there is a high fire or explosion risk, but also allows repairs to be made much more efficiently in other areas. It provides a reliable seal under relatively high pressure conditions, and is generally less expensive than repair assemblies requiring welding or cutting out of pipe sections. This assembly could also be used for "hot tapping" into a pipe by providing a flange connector on the larger hub section 18 through which the pipe can be drilled.

Although a preferred embodiment of the invention has been described above by way of example only, it will be understood by those skilled in the field that modifications may be made to the disclosed embodiment without departing from the scope of the invention, which is defined by the

I claim:

1. A pipe repair assembly, comprising:
   an elongate hub member having a through bore size to fit over a pipe and a substantially smooth outer cylindrical periphery;
   the hub member being formed in two separate, mating portions, a first one of the portions having a longitudinal slot for fitting the portion transversely over a pipe, and a pair of part-cylindrical, co-axial cut-outs extending from its inner to its outer surface, one on each side of the slot, and the second portion having a crescent-shaped cross-section for longitudinal sliding engagement with said first portion, the outer surface of the crescent shape comprising means for slidable mating engagement with said part-cylindrical cut-outs to cover the slot so that the hub member surrounds the pipe, the inner surface of the crescent shape comprising a part-cylindrical section of diameter corresponding to that of the inner surface of the first portion to form a continuous cylindrical bore surrounding the pipe;
   at least one sealing sleeve for fitting into the gap between the hub member through bore and the pipe, the sleeve having a slit for allowing it to be fitted over the pipe; and
   locking means for urging the sealing sleeve into the hub member through bore and into sealing engagement with the pipe.

2. The assembly as claimed in claim 1, wherein the cut-out areas and the mating surfaces of the second portion have corresponding slight tapers for allowing the second portion to slide freely into the cut-out area of the first portion.

3. The assembly as claimed in claim 1, wherein the hub member through bore has opposing smooth frusto-conical sections of decreasing diameter extending from opposite ends of the member towards its central area;
   two sealing sleeves are provided for fitting into the respective opposite frusto-conical sections of the through bore; and
   the sealing sleeves having smooth frusto-conical outer surfaces of complementary shape to the respective frusto-conical sections of the bore for close mating engagement with the opposing bore surfaces, and having inner diameters sized for a close sliding fit with a pipe.

4. The assembly as claimed in claim 3, wherein the frusto-conical sections extend to the center of the hub through bore, and the sealing sleeves have complementary formations at their inner ends for allowing the sleeves to overlap into sealing engagement when locked in the hub member.

5. The assembly as claimed in claim 4, wherein the complementary formations comprise a frusto-conical indent at the smallest diameter end of one of the sleeves for receiving the corresponding end of the other sleeve.

6. The assembly as claimed in claim 3, wherein each sleeve is cylindrical and has a longitudinal slit for allowing it to be fitted transversely over a pipe.

7. The assembly as claimed in claim 3, wherein each sleeve is cylindrical and has a spiral slit for allowing it to be wrapped around a pipe.

8. The assembly as claimed in claim 3, wherein the locking means comprises a pair of annular flanges for fitting against opposite ends of the hub member, each flange being formed in two separate parts for fitting around the pipe;
   a collar projecting from each flange into the respective opposite ends of the hub through bore to engage the outer end of the respective sealing sleeve; and
   securing means for locking the respective flange to the hub member to urge the collar into the hub bore and urge the sleeves into sealing engagement with one another and with the pipe.

9. The assembly as claimed in claim 3, wherein the sealing sleeves are of a substantially inert plastic material.

* * * * *